United States Patent [19]

Doering et al.

[11] 4,118,748
[45] Oct. 3, 1978

[54] MEMBER FOR LIMITING AIR DOOR MOVEMENT IN A DISK CARTRIDGE

[75] Inventors: Arlin B. Doering, South St. Paul; Kenneth H. Volness, St. Paul, both of Minn.

[73] Assignee: Minnesota Mining and Manufacturing Company, St. Paul, Minn.

[21] Appl. No.: 707,712

[22] Filed: Jul. 21, 1976

[51] Int. Cl.² .................... G11B 5/82; G11B 17/26; G11B 23/04
[52] U.S. Cl. .............................. 360/133; 220/315; 360/135
[58] Field of Search ................ 360/133–135, 360/132, 86, 97–99; 206/444, 387; 220/315; 346/137

[56] References Cited

U.S. PATENT DOCUMENTS

| 3,526,884 | 4/1965 | Buslik et al. | 206/444 |
| 3,635,608 | 1/1972 | Crouch et al. | 360/133 |
| 3,688,289 | 8/1972 | Schnell et al. | 346/137 |
| 3,800,325 | 3/1974 | O'Brien | 360/133 |
| 3,812,534 | 5/1974 | Rousseau et al. | 360/133 |

OTHER PUBLICATIONS

IBM Tech. Disc. Bulletin, Kellogg et al., Magnetic Disk Cartridge, vol. 18, No. 10, Mar. 1976, pp. 3397–3399.

Primary Examiner—Alfred H. Eddleman
Attorney, Agent, or Firm—Cruzan Alexander; Donald M. Sell; William L. Huebsch

[57] ABSTRACT

A unitary polymeric member for limiting the travel of an air entrance door in the housing of a disk cartridge. First and second anchor portions of the member are attached respectively to the door and the housing. Movement limiting means comprising two rigid links attached in series between the anchor portions by thin hinge sections afford movement of the door between a closed position adjacent the housing with the door closing an air inlet port in the housing and the links in side by side relationship, and a full open position with the links tensioned between the housing and door.

4 Claims, 7 Drawing Figures

U.S. Patent   Oct. 3, 1978   4,118,748
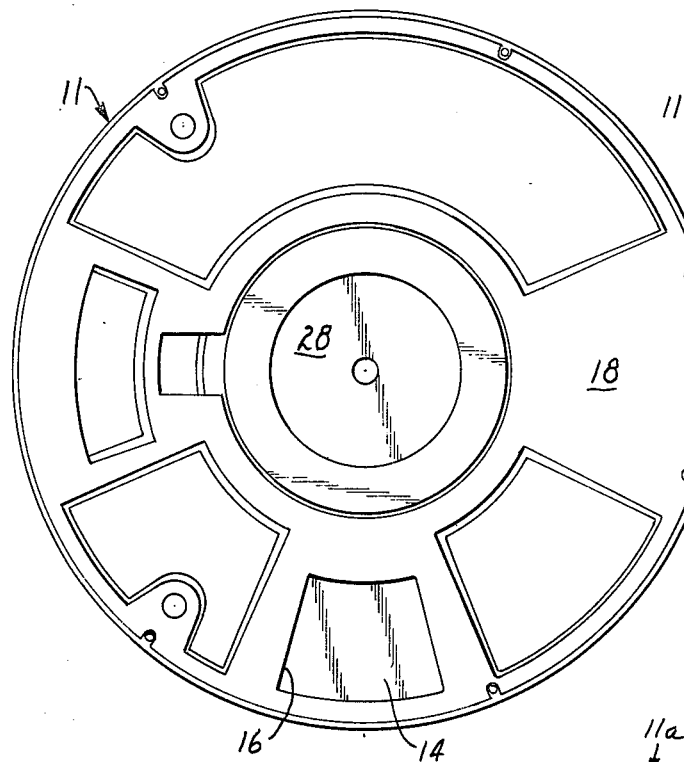
FIG.1
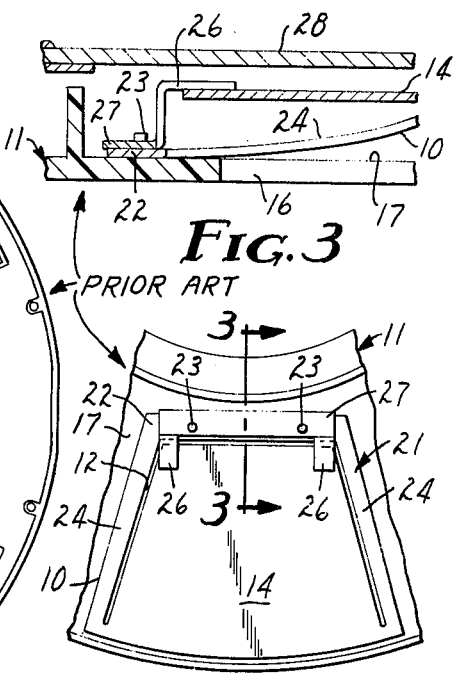
FIG.3 PRIOR ART
FIG.2
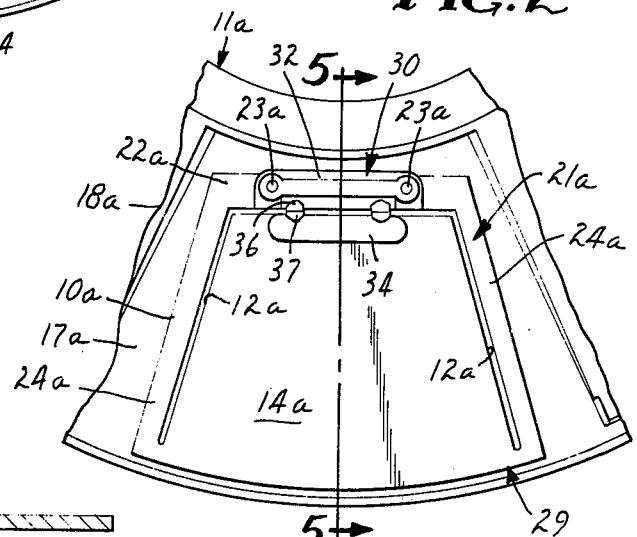
FIG.4
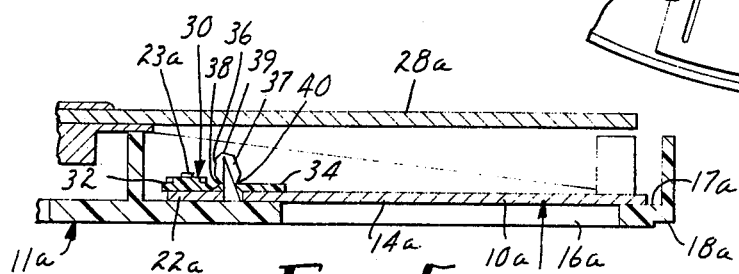
FIG.5
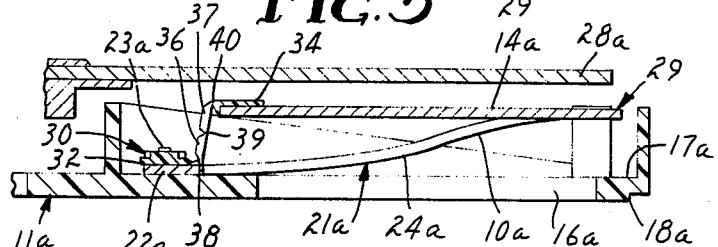
FIG.7
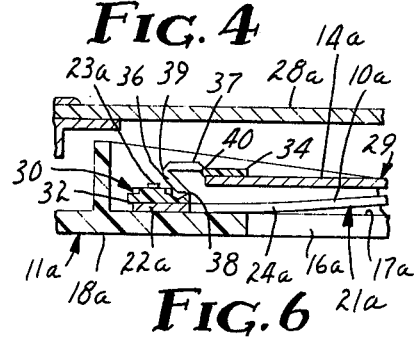
FIG.6 ated from the American National Standards Institute, 1430 Broadway, New York, New York 10018 (the content whereof is incorporated herein by reference), have an air inlet port through which filtered air may flow into the disk cartridge from a disk drive unit with which the cartridge is engaged. Normally associated with the air inlet port is an air door assembly. This air door assembly includes an air door adapted to cover the air inlet port, and means normally biasing the air door to a closed position over the air inlet port from which the air door can be moved to an open position against the influence of the biasing means when a member on the drive unit engages the air door.

MEMBER FOR LIMITING AIR DOOR MOVEMENT IN A DISK CARTRIDGE

BACKGROUND OF THE INVENTION

This invention relates to devices for limiting the travel of an air door in a disk cartridge.

Disk cartridges of the type fully described in American National Standard — X3.52 — 1976, available from the American National Standards Institute, 1430 Broadway, New York, New York 10018 (the content whereof is incorporated herein by reference), have an air inlet port through which filtered air may flow into the disk cartridge from a disk drive unit with which the cartridge is engaged. Normally associated with the air inlet port is an air door assembly. This air door assembly includes an air door adapted to cover the air inlet port, and means normally biasing the air door to a closed position over the air inlet port from which the air door can be moved to an open position against the influence of the biasing means when a member on the drive unit engages the air door.

As may be seen in FIGS. 1, 2 and 3 of the drawing, one prior art air door assembly commonly used on a cartridge 11 of the aforementioned type comprises a spring steel plate 10 having a generally U-shaped slot 12 closely spaced from the periphery of the plate on three sides to define a large portion of the plate 10 providing the air door 14 which is shaped to extend across the air inlet port 16 (FIG. 1) in a circular housing 18 for the disk cartridge 11 on the inner surface 17 of the housing 18 (FIG. 2). The slot 12 also defines a generally U-shaped portion of the plate 10 which provides a biasing strip 21 extending around three sides of the air door 14. The biasing strip includes a central length or portion 22 which is fixedly attached to the housing 18 as by two rivets 23, and side lengths 24 which extend generally radially outwardly of the housing 18 from the central portion 22 and attach the central portion 22 to the air door 14. The side lengths 24, being resiliently flexible, will bend sinuously into two arcuate portions to afford movement of the air door 14 away from the inner surface 17 of the housing 18 in an attitude which may or may not be generally parallel thereto.

This prior art air door assembly also includes means for limiting movement of the air door 14 away from the housing 18 including two metal hook-like members 26 projecting from a common base 27 attached over the central portion 22 of the biasing strip 21 by the rivets 23. The projecting hook-like members 26 engage the air door 14 adjacent its inner edge when that edge reaches a full open position, and thereby restrict engagement of the air door 14 with a disk 28 in the cartridge 11 which might cause scratching or marring of the magnetizable coating on the disk 28. Such hook-like members 26, however, present potential problems in that it is possible during handling of the disk cartridge 11 removed from a disk drive to displace the disk 28 which is loosely retained within the cartridge 11 so that the disk 28 impinges against the hook-like members 26 and the magnetic coating on the disk 28 is damaged, thereby making the disk 28 unsuitable for recording data, and possibly losing prerecorded information.

SUMMARY OF THE INVENTION

The present invention provides a unitary polymeric member adapted to replace the metal hook-like members in the known type of door assembly described above. The member provides a positive limit to the travel of the inner edge of the air door at its full open position and yet when the air door is closed the member does not project from the inner surface of the housing a distance which will allow it to be contacted by a disk retained in the cartridge.

Also, in its preferred embodiment the member provides a small resistive force to initial opening movement of the air door which restricts inadvertent opening of the air door by persons handling the disk cartridge.

The unitary polymeric member for limiting movement of an air door according to the present invention comprises a first anchor portion attached along the edge of the air door adjacent the central length of the biasing strip, and a second anchor portion attached to the housing over the central length of the biasing strip. First and second rigid link portions of almost equal length are attached in series between the anchor portions by thin flexible hinge portions. When the air door is closed, the link portions are face to face and tented inwardly of the cartridge from the inner surface of the housing. The length of the links is about half the height of the metal hook-like members, and is not sufficient that the joined ends of the links can be impinged by the disk in the cartridge. When a force is applied to open the air door, the member provides a slight resistive force necessary to tip the tented links to a position more parallel to the air door. After this initial opening force is overcome the joined link portions afford free opening movement of the air door and provide a limit to opening movement of the inner edge of the air door at its full open position. When the air door is open, the links are disposed to allow the air door to again be moved to its closed position under the influence of the biasing strip when the opening force is removed.

BRIEF DESCRIPTION OF THE DRAWING

The present invention will be further described with reference to the accompanying drawing wherein like numbers refer to like parts in the several views and wherein:

FIG. 1 is a plan view of the bottom of a disk cartridge including an air door of the type with which a member according to the present invention is adapted to be used;

FIG. 2 is a fragmentary plan view showing the air door assembly in a disk cartridge such as that shown in FIG. 1 taken from inside the cartridge, which air door assembly includes prior art members for limiting movement of the inner edge of the air door at its full open position;

FIG. 3 is an enlarged fragmentary sectional view taken approximately along lines 3—3 of FIG. 2;

FIG. 4 is a plan view of an air door assembly for use in a disk cartridge such as that shown in FIG. 1 taken from inside the cartridge with the air door closed and including a member according to the present invention for limiting movement of the inner edge of the air door at its full open position;

FIG. 5 is an enlarged fragmentary sectional view taken along lines 5—5 of FIG. 4;

FIG. 6 is a fragmentary sectional view similar to FIG. 5, but showing the air door as it initially starts to open; and FIG. 7 is a fragmentary sectional view similar to FIG. 5, but showing the air door in its full open positon.

DESCRIPTION OF THE PREFERRED EMBODIMENT

Referring now to FIGS. 4, 5 and 6 there is shown an air door assembly 29 for use in a disk cartridge of the type illustrated in FIG. 1, which air door assembly 29 includes a member 30 according to the present invention for limiting travel of the inner edge of an air door 14a in the assembly 29.

The air door assembly 29 has many parts which are essentially identical to the parts of the prior art air door assembly illustrated in FIGS. 2 and 3 and described above. These identical parts and the parts of the cartridge to which they are attached are identified with the same reference numerals used above, except for the addition of the suffix "a".

Included in the air door assembly 29 are a spring steel plate 10a having a generally U-shaped slot 12a defining the air door 14a, which air door 14a extends across an air port 16a in a housing 18a for a disk cartridge on an inner surface 17a of the housing 18a. The slot 12a also defines a generally U-shaped portion of the plate 10a which provides a biasing strip 21a extending around three sides of the air door 14a, including a central length or portion 22a fixed to the housing 18a as by two rivets 23a and side lengths 24a which extend radially outwardly of the housing 18a from the central portion 22a and attach the central portion 22a to the air door 14a. As illustrated in FIG. 6, the side lengths 24a are resiliently flexible and will bend sinuously into two arcuate portions about axes on different sides of the side lengths 24a. Such bending affords movement of the air door 14a away from the inner surface 17a of the housing 18a in an attitude which may or may not be generally parallel thereto in response to a force applied to the outer surface of the air door 14a, which force may be applied by a portion of a drive unit (not shown) when the cartridge is inserted therein. The side lengths 24a also provide spring biasing to return the air door 14a to its closed position upon removal of the force opening the air door 14a.

The member 30 for limiting movement of the inner edge of the air door 14a is a unitary polymeric member comprising an elongate first anchor portion 32 attached to the housing 18a over the central portion 22a of the biasing strip 21a by the rivets 23a, and a second anchor portion 34 attached to the inner surface of the air door 14a along its edge adjacent the central portion 22a of the biasing strip 21a as by adhesive bonding. Where the material of the member 30 is polypropylene, a preferred adhesive for such bondage is that designated "Scotch Grip No. 4693" available from Minnesota Mining and Manufacturing Company, St. Paul, Minn.

The anchor portions 32 and 34 are coupled together at two places by attaching structures affording movement of the inner edge of the air door 14a away from its closed position for a limited distance to a full open position against the bias of the side lengths 24a of the biasing strip 21a. Each attaching structure comprises first and second elongate rigid link portions 36 and 37 of about the same length attached in series between the anchor portions 32 and 34 by three thin flexible portions. The thin flexible portions include a first flexible portion 38 attaching the first rigid link portion 36 to the first anchor portion 32; a second flexible portion 39 attaching the end of the first rigid link portion 36 opposite the first anchor portion 32 to the second rigid link portion 37, and a third flexible portion 40 attaching the end of the second rigid link portion 37 opposite the first rigid link portion 36 to the second anchor portion 34.

With the air door 14a in its closed position (FIG. 5) the rigid link portions 36 and 37 are face to face and tented inwardly of the cartridge 11a from the inner surface 17a of the housing 18a. The ends of the link portions 36 and 37 joined by the second flexible portion 39 are the closest to the disk 28a, and the first and third flexible portions 38 and 40 attaching the link portions 36 and 37 to the anchor portions 32 and 34 are in a plane generally parallel with the inner surface of the air door 14a.

When a force is applied to open the air door 14a, the tented link portions 36 and 37 must first be tipped to a position with the link portions 36 and 37 more parallel to the disk 28a (FIG. 6) to afford separation of their ends opposite the second flexible portion 39 in a direction generally normal to the surface 17a of the housing 18a during subsequent opening of the air door 14a. Once the force required to provide this tipping action is provided, the air door 14a moves much more easily to its full open position which is defined when the link portions 36 and 37 are tensioned in a straight line between the anchor portions 32 and 34 (FIG. 7). The side lengths 24a provide more than sufficient biasing to return the air door 14a to its closed position when the force opening the air door 14a is removed.

While the first and second links 36 and 37 are about the same length, preferably the first link 36 is just slightly shorter in length than the second link 37 so that when the air door 14a is closed the first link 36 will project at about a right angle from the surface 17a of the housing 18a and the second link 37 will be at more of an acute angle with respect to the surface 17a (FIG. 5). This position of the links 36 and 37 seems to provide the most desirable level of force to initiate the aforementioned tipping action with respect to the force required to continue opening movement of the air door 14a.

The member 30 is preferably made from polypropylene because of the ease with which that material can be molded into the intricate shape required and the toughness and flexibility of the thin hinge portions 38, 39 and 40 produced.

Also, when the member 30 is of polypropylene it provides a means of protection for the disk during mishandling of the disk cartridge as follows. A person lifting the disk cartridge will sometimes grasp the disk cartridge around its edge with his fingers inserted into the air inlet port 16a and the ends of his fingers against the air door 14a. The weight of the disk cartridge is then largely supported on the ends of the fingers so that the center of the air door 14a will bow inwardly. Under such a condition, the second anchor portion 34 can contact the coated surface of the disk 28a. Tests of such mishandling using a polypropylene member 30 have resulted in no detectable damage to the coating on the disk, apparently because of the relative softness of the polypropylene material.

Another polymeric material from which the member 30 could be formed is polyamide (e.g. nylon-6 or nylon 6—6). Such material, however, is more difficult to mold than polypropylene and may cause more damage to the disk when the disk cartridge is mishandled in the manner indicated above.

While completely flexible attachments could be used between the anchor portions 32 and 34 of the member 30, these would not be preferred since they would not provide the initial resistive force to opening of the air door, and might have a greater tendency to elongate under pressure and allow the inner edge of the air door to move past its intended full open position.

We claim:

1. In a disk cartridge comprising a housing having an air inlet port through which air may be introduced into the housing; a disk having a magnetizable surface layer within the housing; and an air door assembly comprising a spring steel plate having a generally U-shaped slot closely spaced from the periphery of the plate on three sides to define portions of the plate including an air door shaped to extend across said air inlet port on the inner surface of said housing and a U-shaped biasing strip extending around the air door on three sides, said biasing strip including a central length fixedly attached to said housing and side lengths between said central length and said air door extending generally radially outwardly of said cartridge, said side lengths being sinuously flexible to afford movement of said air door away from the inner surface of said housing to an open position in an attitude which may or may not be parallel thereto and providing means for biasing the air door to its closed position, and means for limiting movement of the edge portion of the door adjacent the central length of said biasing strip at a full open position; said disk cartridge being removably mountable on a disk drive unit adapted to engage and rotate the disk within the housing, which drive unit may include means for opening the air door and for injecting air into the disk cartridge upon mounting of the disk cartridge on the disk drive; the improvement wherein said means for limiting movement comprises a unitary polymeric member comprising:

a first anchor portion attached to the central length of said biasing strip;

a second anchor portion attached to said edge portion of said air door;

first and second rigid link portions of about equal length; and first, second and third thin flexible hinge portions, said first flexible hinge portion attaching one end of said first link portion to said first anchor member, said third flexible hinge portion attaching one end of said second link portion to said second anchor portion, and said second flexible hinge portion attaching together the ends of said links opposite said anchor members.

2. A disk cartridge according to claim 1, wherein said means for limiting movement comprises two spaced attaching structures between said anchor portions, each attaching structure comprising first and second rigid link portions and first, second and third flexible hinge portions interrelated as described in claim 1.

3. A disk cartridge according to claim 1, wherein in the closed portions of the air door said first and third flexible hinge portions are adjacent and in a plane generally parallel with the inner surface of said air door with said links face to face and tented toward the interior of said cartridge, so that initial movement of the air door toward said full open position requires tipping of said link portions to an attitude more parallel with the inner surface of said air door to afford subsequent separation of the first and third flexible hinge portions.

4. A disk cartridge according to claim 3, wherein said first link portion is slightly shorter than said second link portion so that said first link portion projects generally at a right angle from the inner surface of said housing.

* * * * *